United States Patent [19]

Landuydt

[11] Patent Number: 4,920,685
[45] Date of Patent: May 1, 1990

[54] FISHING SPINNER

[76] Inventor: Louis J. Landuydt, 200 Ducharme, Dorval, Quebec, Canada, H9S 2H7

[21] Appl. No.: 378,578

[22] Filed: Jun. 20, 1989

[30] Foreign Application Priority Data

Jul. 8, 1988 [CA] Canada .................................. 571561

[51] Int. Cl.⁵ ............................................. A01K 83/00
[52] U.S. Cl. .................... 43/42.04; 43/42.1; 43/42.4; 43/42.41
[58] Field of Search ............... 43/42.1, 42.4, 42.41, 43/42.42, 42.43, 42.44, 42.45, 42, 42.48, 42.04, 42

[56] References Cited

U.S. PATENT DOCUMENTS 1,320,570 8/1918 Reynolds ........................... 43/42.41
2,503,369 2/1948 Wycech .............................. 43/42.41
2,597,035 4/1948 Richard ................................ 43/42.4
2,629,199 5/1948 Larson ................................ 43/42.41

FOREIGN PATENT DOCUMENTS 100221 4/1961 Norway ............................. 43/42.41

Primary Examiner—Nicholas P. Godici
Assistant Examiner—Michael William Starkweather
Attorney, Agent, or Firm—Darby & Darby

[57] ABSTRACT

A fishing spinner, comprising a body and a hook attached to the rear part of the body. Means are provided for holding the hook in a retracted position underneath of the body during its displacement in water. Means may be provided for preventing weed, vegetation or algae from being collected by the hook during its displacement in water in its retracted position.

43 Claims, 8 Drawing Sheets

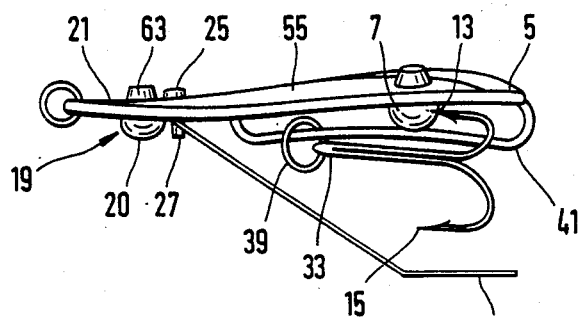
FIG. 3
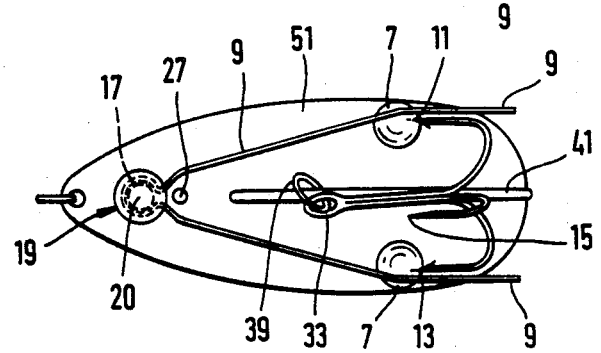
FIG. 4
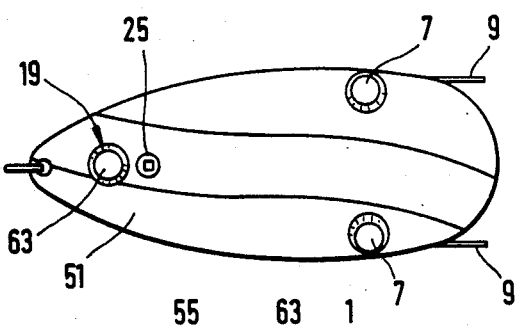
FIG. 5
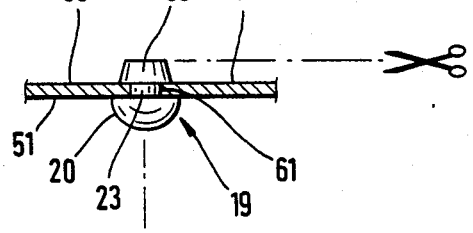
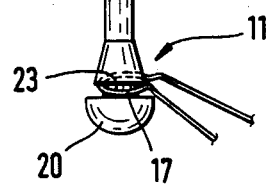
FIG. 6

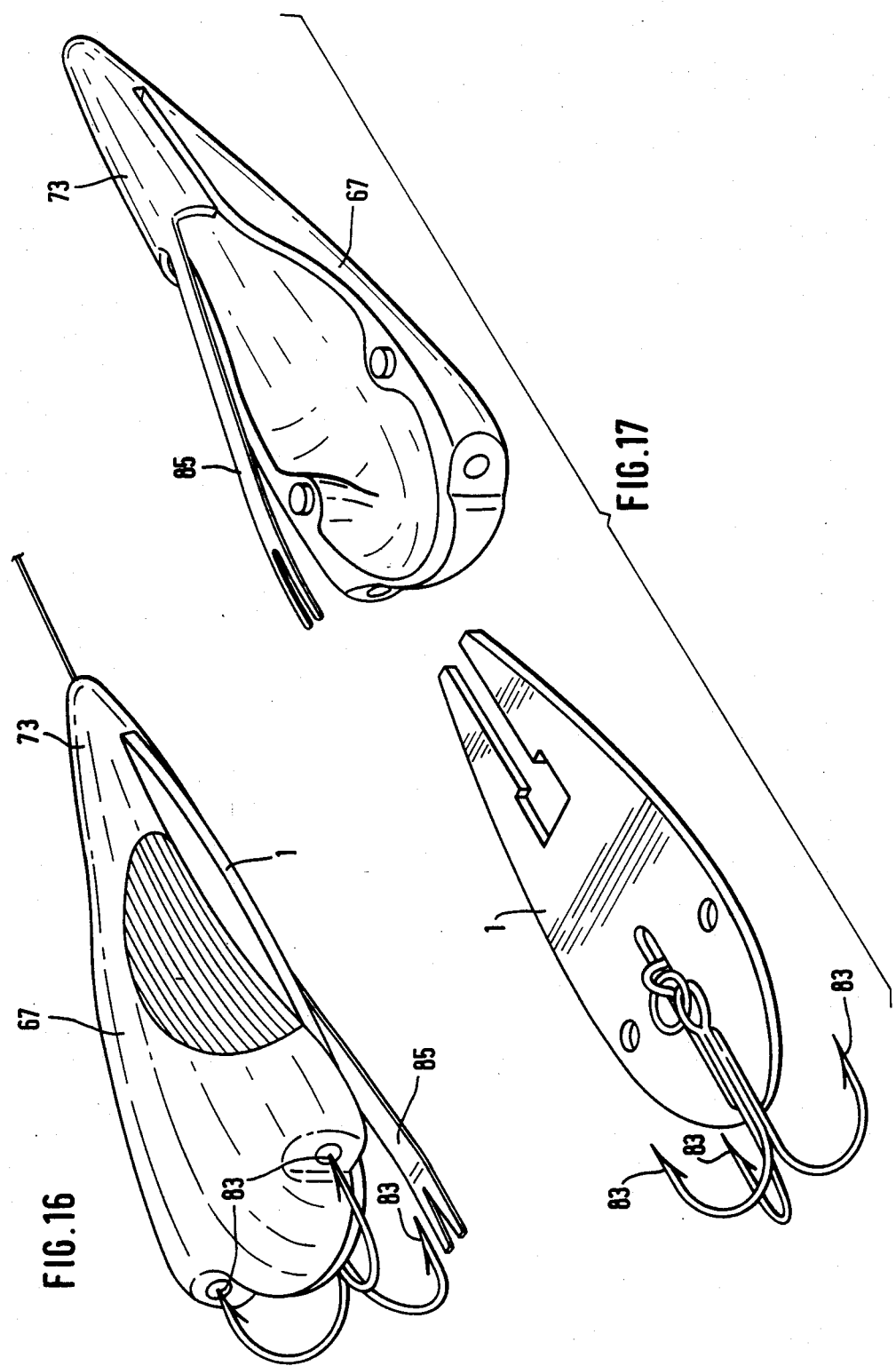

FISHING SPINNER

BACKGROUND OF THE INVENTION

1. Field of the invention

The present invention relates to a spinner used as fishing lure.

In particular, the present invention relates to a spinner used by anglers for catching largemouth and smallmouth bass, pikes, pickerel, salmon, trout or any other kind of carnivorous fish which live, in particular, in deep waters.

2. Description of the prior art

The most common spinner used till now shows a hook with a single point fixedly attached to the body or blade of the spinner, the single point of the hook extending out from the rear end of the blade.

There are also on the market spinners having a blade or body, to the rear end or butt of which is attached a treble hook by means of a swivel.

The spinners used till now have not given satisfactory results for effectively hooking a fish. In fact with a treble hook swivelling at the rear part of the body of the spinner, the fish which bites the hook usually bites one of the points of the hook and it often happens that with energetic struggle it succeeds to avoid the other two points of the hook and thus liberates itself from the single point of the hook and escapes.

The same drawbacks exists in a single pointed hook fixedly attached to the body of the spinner. When a fish hits the spinner, used as a bates, it sometimes happens that due to the struggle of the fish, the single pointed hook does not fully penetrate into the flesh of the mouth of the fish and the latter therefore escapes.

The spinners used till now did not also give satisfactory results for preventing weed, vegetation or algae from being collected by the hook when cranked, pulled or retrieved in deep waters.

There has been some attempts to prevent the latter drawback, i.e. collecting of weed, vegetation, algae or the like but no positive results were obtained.

In spinners having a treble hook attached at the rear part of the blade by means of a swivel, the drawback resides in the fact that the treble hook always swings at the rear of the blade and no proper prevention is provided against the collecting of weed, vegetation or algae or the like even if a weedguard is present at the bottom of the blade. The treble hook pivoting or rotating during the cranking of the reel i.e. moving at all directions, it inevitably collects some weed, vegetation, algae or the like even if some kind of weedguard is present. This is a drawback which every fisherman is annoyed of and wishes to avoid and the present invention has now found the necessary arrangement of elements in order to provide an effective hooking action and also an enhanced protection against the collecting of weed, vegetation, algae or the like on the hook.

Furthermore, the weedguards already existing on the market and used with some spinners and made of steel wire have also the drawback of being solidly fastened at the bottom surface of the blade of the spinner (bottom surface meaning the surface where the abdomen would be on a living creature). However, it is evident that such weedguards are subjected to brutal use by the strong mouths of carnivorous fish and after some use, they are either broken, or grossly deformed and therefore their effectiveness is lost and the entire spinner is to be disposed of, due to the fact that either the weedguard is not replaceable or it is very complicated and time consuming to replace it. Therefore, it is obvious that an advantage would be to have a weedguard which is easily replaceable and the present invention overcomes such drawback and provides a weedguard which is easily replaceable.

OBJECTS OF THE INVENTION

Therefore, an object of the present invention is to provide a spinner with a treble hook attached at the rear part of the blade or body of the spinner and so provided underneath the body of the spinner that it point or points effectively penetrate into the mouth of a fish.

Another object is the provision of a weedguard in the vicinity of the treble hook in order to prevent weed, vegetation, algae or the like to be collected by the hook during its displacement in water.

One important feature of the present invention is therefore the fact of so arranging and releasably holding the treble hook underneath of the body of the spinner that it provides an effective hooking action. In fact with such arrangement of the hook underneath the body of the spinner during its displacement in the water, the target which the fish aims and hits is the entire assembly consisting of the body of the spinner and of the hook and not the hook alone swinging at the rear of the body as in the prior art, and thus the entire spinner with its hook is more centrally positioned in the jaw of the fish. This feature combined with a weedguard provided underneath of the body of the spinner prevents most of the weed, vegetation, algae or the like to be collected by the treble hook during its displacement in water. The body or blade of the spinner itself provides already an anti-weed protection and therefore acts as a weedguard against the collecting of weed, vegetation, algae or the like by one or preferably two of the points of the treble hook which is or are used for releasably holding the hook in a retracted position underneath the body.

Another object of the present invention is the provision of a weedguard which is easily replaceable when it is deformed or broken.

In one embodiment, the upper surface of the blade or body of the spinner has means which provide an increased protection against the collecting of weed, vegetation, algae or the like by the upper surface of the blade.

SUMMARY OF THE INVENTION

According to the present invention there is provided a fishing spinner, comprising:
a body,
a hook attached to the rear part of the body, and
means for holding the hook in a retracted position underneath of the body during its displacement in water.

The hook may be loosely attached to the rear part of the body or it may be slidably mounted underneath the body.

According to the present invention, there is also provided a fishing spinner, comprising:
a body,
a hook attached to the rear part of the body,
means for holding the hook in a retracted position underneath of the body during its displacement in water, and means for preventing weed, vegetation or algae from being collected by the hook during its displacement in water in the retracted position.

In one preferred embodiment, the hook is swingingly attached to a hole provided at the rear part of the body by means of a chain having such a predetermined length as to provide a swinging connection of the hook to the body at a predetermined distance from the rear part of the body when the hook is liberated from the holding means and is in an extended position out of the boundries of the body.

According to the present invention there is also provided a fishing spinner, comprising:
 a body,
 a hook slidably mounted underneath of the body,
 means for detachably holding at least one point of the hook for maintaining the hook in a retracted position underneath and within the bounderies of the body and preventing it from swinging during displacement in water,
 means for providing the sliding of the hook from the retracted position to an extended libarated position beyond the rear part of the body, and
 means for preventing weed, vegetation or algae from being collected by the hook during the displacement of the spinner in water with the hook in said retracted position.

In a preferred embodiment, two points of the treble hook are detachably held by two rubber nubs located opposite each other at lateral sides of the rear part at the bottom surface of the body, the end of the hook being formed as an eye and being connected to a ring which hangingly slides along a track element for positioning the treble hook in its retracted position or in an extended position when the two points are liberated from the two rubber nubs under the bite and struggling and pulling force of a caught fish.

According to one embodiment of the invention, the hook is a treble hook, and the means for detachably holding at least one point of the hook are rubber nubs. The means for providing the sliding of the treble hook comprises a longitudinal slot in the body, slot through which passes one end part of a weight element, end part which is swivelled to the end of the treble hook opposite the at least one point. The means for preventing weed, vegetation or algae from being collected by the hook is a deformable means, as in the other embodiments.

Satisfactory results are obtained with the spinner as above described. However, further embodiments have been devised by the inventor with a view of having a spinner more attractive and appealing to the eye of the fisher and also for providing an improved and better connection between a ring or swivel system, provided at the pulling end of the body of the spinner opposite to the end where a treble hook is attached, and a fishing line.

Therefore, according to the present invention, there is also provided a fishing spinner, comprising:
 cover means adapted to shelter a connection system which connects the body to a fishing line, said connection system being provided at the pulling end of the body, said cover means thus preventing algae and weed from being collected by the connection system.

Preferably, the connection system may comprise a swivel, and the cover means swivelingly shelters the connection system; or it may comprise a ring swivelingly abutting against edges of the cover means, the ring being connected directly to the fishing line.

According to the present invention, there is also provided a protective head cooperating with a connection system of a fishing spinner, comprising:
 retaining means receiving a loose end of a fishing line and securely retaining a tip of said loose end substantially flush with an outer surface of the head.

Preferably, the connection system is a swivel system, and the protective head has a conical shape.

Preferably, the retaining means may comprise:
 a cut-off part made on the wall of the head, and
 a slit in the cut-off part for securely holding the tip of the loose end of the fishing line when the fishing line is inserted inside the slit and afterwords cut flush with the upper surface of the cut-off part.

The slit may have a funnel-shaped entry in order to facilitate the entry of the loose end of the fishing line therein.

BRIEF DESCRIPTION OF THE DRAWINGS

Preferred embodiments will now be described as examples without limitative manner, having reference the attached drawings, wherein:

FIG. 3 is a side view of a second embodiment according to the present invention with the treble hook in its retracted position;

FIG. 4 is a bottom view of the second embodiment shown in FIG. 3;

FIG. 5 is a top view of the second embodiment shown in FIG. 3;

FIG. 6 is a detail view of an element used for replaceably connecting the weedguard to the blade;

FIG. 16 is a perspective view in a different angle of a spinner similar to the spinner of FIG. 12 or 14, with a cover body, wherein the cover body is fully shown;

FIG. 17 is a perspective view of one embodiment wherein the cover body may be snap-fit to the body of the spinner;

DESCRIPTION OF EXAMPLARY EMBODIMENTS

Figure 1:
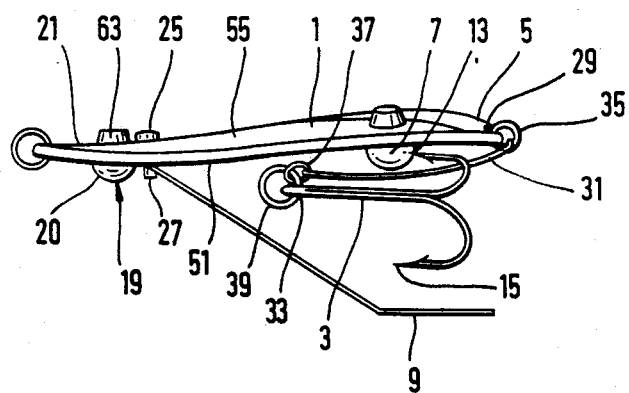
FIG. 1 is a side view of a first embodiment of the spinner according to the present invention wherein the treble hook is in its retracted position underneath the body of the spinner.
Figure 2:
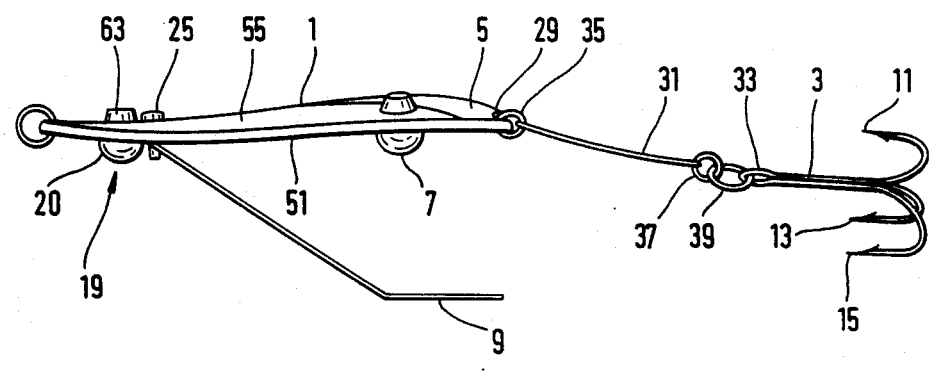
FIG. 2 is a side view of the first embodiment showing the treble hook in its extended position at the rear part and outside the boundaries or contour of the blade.

In the first embodiment shown in FIGS. 1 and 2, the spinner shows a body or blade 1 and a treble hook 3.

Contrary to the already existing spinners of this type, the treble hook 3 is not directly connected at the rear part 5 of the body 1 by means of a swivel but is attached at the rear part 5 by means of a chain 31 having such a predetermined length as to permit the releasable holding of the hook 3 in a retracted position underneath and within the boundaries or contour of the body or blade 1 (FIG. 1) or in a extended ondulating or swinging position outside the boundaries or contour of the spinner (FIG. 2).

Underneath the body 1, there are provided means, such as rubber nubs 7, for holding the hook in a retracted position underneath of the body 1 during its displacement in the water.

The treble hook 3 is swingingly attached to a hole 29 provided at the rear part of the body 1 by means of the chain 31 having such a predetermined length as to allow to the treble hook 3 to be releasably positioned underneath the body 1 of the spinner and be held in a retracted position by the fact of having two of its points 11 and 13 inserted into the rubber nubs 7. The chain 31 with its predetermined length also provides a swinging connection of the treble hook 3 to the body 1 at a predetermined distance from the rear part 5 thereof when the treble hook 3 is liberated from the holding rubber nubs 7 under the pulling action of the bite of a fish and is in an extended position out of the boundaries or contour of the body as clearly shown in FIG. 2.

The chain 31 has a first end provided with a first ring 35 attached to the hole 29 at the rear part 5 of the body 1 and a second end provided with a second ring 37 attached to the eye 33 of the treble hook by means of a third ring 39. Of course any other connection of the treble hook 3 to the rear part 5 of the body 1 can be envisaged, the final objective being to provide a loosely attached treble hook 3 to the rear part 5 of the body 1. For instance, instead of the hole 29, it is possible to provide a further ring or any other means underneath the rear part 5 of the body 1 to which the first ring 35 may be connected.

Deformable means such as spring-steel wires or filaments 9, acting as a weedguard, is attached to the bottom of the body 1 in order to prevent weed, vegetation or algae from being collected by the hook during its displacement in water in its retracted position.

In the embodiment shown in FIGS. 1 and 2, two of the points 11 and 13 of the treble hook 3 are inserted into two rubber nubs 7, located opposite each other at lateral sides of the bottom surface 51 of the rear portion of the body 1 and are detachably held by the rubber nubs 7 in such a way that the treble hook 3 assumes a retracted stationary but releasable position underneath and within the boundaries or contour of the body. The third point 15 of the treble hook 3 is free.

The weedguard for preventing weed, vegetation or algae or the like from being collected by the treble hook 3 during its displacement in water in its retracted stationnary position underneath the body 1, is as above explained, in the form of spring-steel wires or filaments 9 with two branches and a common end 17 (FIG. 4 and 6) which are resiliently and removably or detachably attached to a third rubber nub 19 provided at the front part 21 of the body 1 opposite to the rear part 5.

Figure 10:
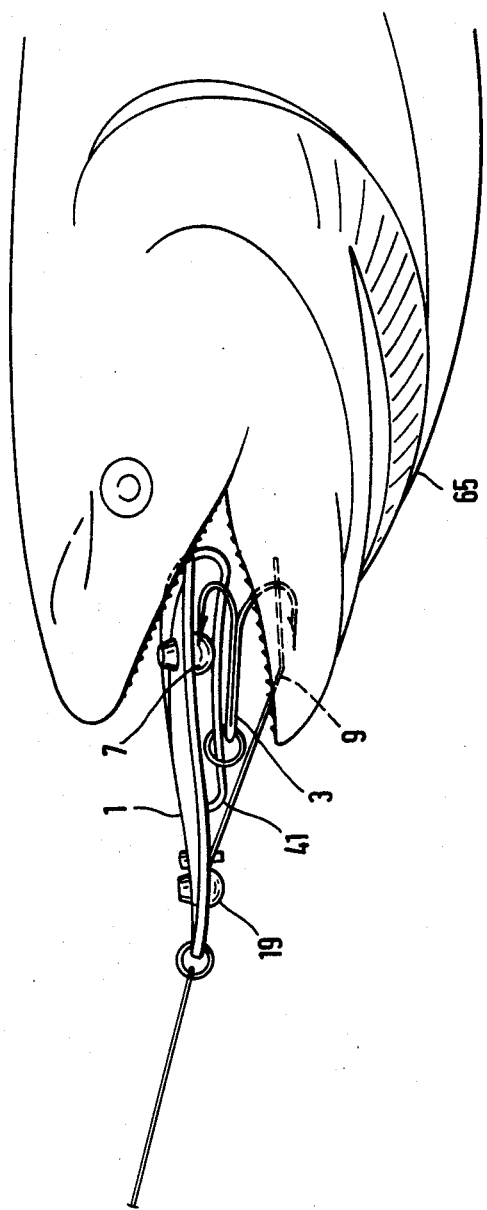
FIG. 10 shows the spinner according to the present invention at the beginning of a hit.

The fact of having the common end 17 resiliently attached to the rubber nub 19 provides a springy action for the weedguard 9 when a fish bites the spinner and pushes and closes the weedguard toward the treble hook 3 (see FIG. 10). Such a springy action counterbalances the heavy stress to which the metal of the weedguard is subjected and therefore prolongs its life contrary to the weedguards already on the market which lacking such springy action at their point of connection to the bottom of the lure or spinner are more inclined to be broken after some use.

The way of removably connecting the common end 17 of the weedguard 9 to the third rubber nub 19 at the front part 21 of the body 1 is also very important inasmuch as it provides the removal and replacement of the weedguard 9 when it is broken or distorted after several uses.

The common end 17 of the spring-steel wires is in the form of a substantially three quarter of a circle, adapted to be pivotally and replaceably snap-fit around a shank 23 of the rubber nub 19, between a head 20 of the nub 19 and the bottom surface 51 of the body 1, the nub 19 being connected to the bottom surface 51 of the front part 21 of the body 1.

The rubber nub 19 is replaceably force-fit into an opening 61 (FIG. 6) made in the body 1, the shank 23 being adapted to be lodged inside this opening 61, a counter-head or nut element 63 replaceably maintaining the entire rubber nub 19 in place.

The common end 17 of the spring-steel wires is more particularly in the form of "10 past 10" on a watch dial.

The rubber nub 19 provides a springy connection of the spring-steel wires 9 to body 1 in such a way that it is the rubber nub 19 which absorbs all the efforts to which is subjected the spring-steel wires 9 when the wires undergoe heavy deformation under the struggling action of the jaw or mouth of a caught fish.

Being made of rubber or any resilient material, it is easy to pull the common end 17 out of the shank 23 by simply forcing it out from its place.

In order to prevent the unwanted pivotal of the weedguard 9 under the struggling action of the jaw of a caught fish, there is provided a stop element 25 at the bottom surface 51 of the body 1. When it is necessary to remove the weedguard 9 from its place for replacing it, the stop element 25 is easily passed round by simply passing one branch of the weedguard 9 over the lower extremity 27 of the stop element 25 and afterwards forcing the common end 17 thereof out from the shank 23 as above explained.

The common end 17 of the spring-steel wires 9 substantially resembles the head of a cotter pin having the form as above explained. However any other equivalent means for providing to the weedguard 9 its resiliency on the one hand and its character of replaceability on the other hand may also be used.

In a second embodiment shown in FIGS. 3, 4 and 5, the treble hook 3 is slidably mounted underneath the body 1 instead of being loosely attached at the rear part 5 of the body. Two points 11 and 13 of the treble hook 3 are inserted, as in the first embodiment, into two rubber nubs 7, located opposite each other at lateral sides of the rear part 5 at the bottom surface 51 of the body 1.

In the second embodiment, the ring 39 attached to the eye 33 of the treble hook 3 instead of being loosely connected at the rear part 5 of the body 1 is slidably mounted underneath the body 1 and slides along a rail or track element 41 provided at the bottom part of the body 1. The track element 41 has one of its ends fixedly connected to the rear part 5 of the body 1 and its other end fixedly connected at a predetermined distance from the front part 21 of the body 1 at a location near the stop element 25.

As is evident, when the points 11, 13 of the hook 3 are pulled out of their holding rubber nubs 7 by the bite of a fish, the treble hook 3 slides along the track element 41 for positioning itself in an extended position beyond the rear part 5 and outside the contour of the body 1, with the points 11, 13 and 15, liberated and inserted into the flesh of the jaws of a struggling fish.

The rubber nubs 7 and 19 may be replaced by any equivalent element performing the same purpose. Use may be made of elements which are replaceable when, due to wear or accident, they are out of use.

Figure 7:
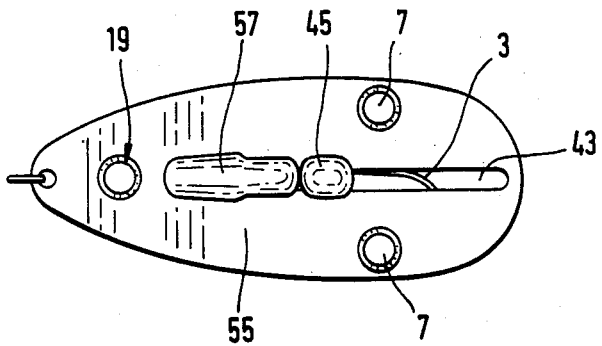
FIG. 7 is a top view of a third embodiment according to the present invention.
Figure 8:
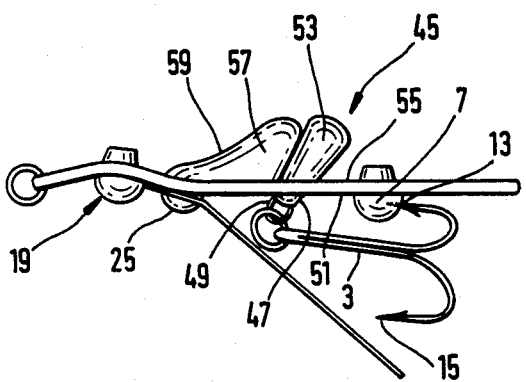
FIG. 8 is a side view of the third embodiment shown in FIG. 7.
Figure 9:
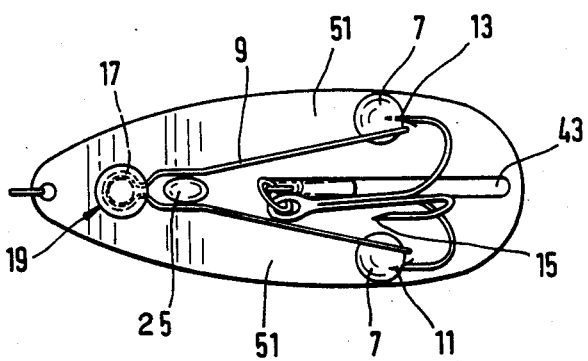
FIG. 9 is a bottom view of the third embodiment shown in FIG. 7.

In a third embodiment shown in FIGS. 7, 8 and 9, the treble hook 3 is adapted to slide underneath the body 1 of the spinner not along a rail element 41 as in the embodiment of FIGS. 3, 4 and 5, but along a central longitudinal slot 43 made in the body 1 of the spinner. The ring 39 attached to the eye 33 of the treble hook 3 is connected to a weight or mass element 45, having one end part 47 inserted through the slot 43 and located underneath the body 1, the end part 47 being provided with a ring 49 which is swivelled to the ring 39 of the treble hook 3. The other end part 53 of the weight element 45 has a dimension greater than the width of the longitudinal slot 43 in such a way that the weight element 45 never traverses the slot 43 and keeps the treble hook 3 slidably hanging underneath the body 1 of the spinner, the treble hook 3 being thus adapted to slide along the slot 43 to be positionned in a retracted position or in a extended position when the two points 11 and 13 are liberated from the corresponding two nubs 7 under the bite and struggling and pulling force of a caught fish.

As in the other two embodiments, at least one of the points of the treble hook 3, and preferably two of its points 11 and 13, are held in the rubber nubs 7 which are similar to the above described rubber nubs.

In the third embodiment, on the upper surface 55 of the body 1, there is provided a bulged or stop element 57 against which the weight element 45 bears when it is in a forward position with the treble hook 3 in a retracted position underneath and within the bounderies of said body 1. On the other hand the bulged or stop element 57 is so formed as to provide an inclined sliding surface 59 acting as a further weedguard on the side of the upper surface 55 of the spinner preventing any weed, vegetation or algae being caught by the upper surface 55 of the body 1 and the weight element 45 during the displacement of the spinner in the water.

Of course, equivalent means to the weight element 45 and to the bulged or stop element 57 may be used for attaining the same results as above explained.

Figure 11:
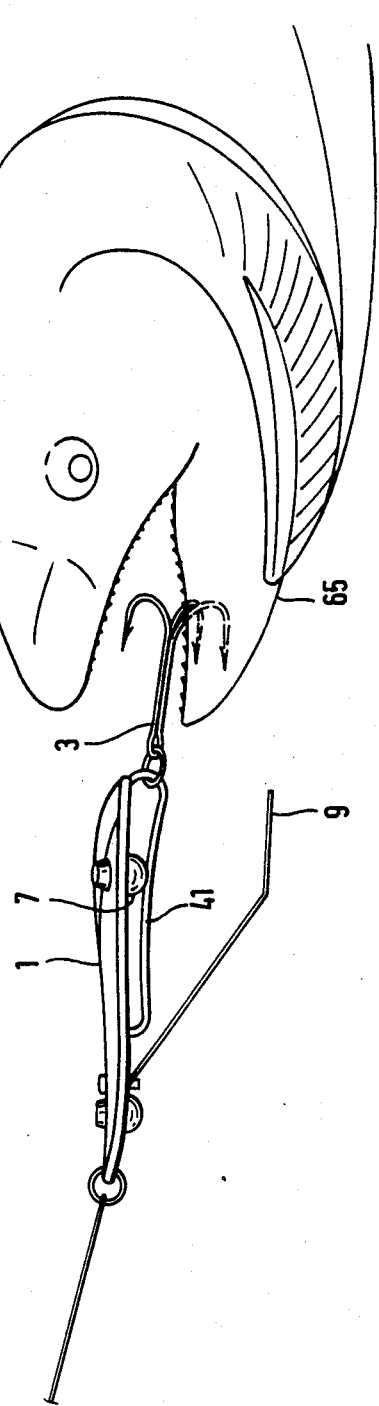
FIG. 11 is a view of the spinner according to the present invention when the treble hook is in its extended position and the fish in its final "caught" position.

FIGS. 10 and 11 show the spinner of the present invention in real use. Though the example shown in these Figures makes use of the spinner shown in the second embodiment, it is evident that the use and functioning of the other embodiments are the same.

In FIG. 10, the treble hook 3 is in its retracted position underneath and within the contour of the body 1 of the spinner, and the fish 63, be it a largemouth or smallmouth bass, northern pike, chain pickerel, rock bass, or the like, hits the bait which is the spinner. As is clearly shown, the spring-steel wires 9 forming the weedguard are deformed and compressed towards the treble hook 3 but does not prevent the flesh of the jaw of the fish to be caught by the point 15 of the treble hook 3. Once this point 15 enters the flesh, the other points 11 and 13 are freed or broken from the two lateral rubber nubs 7 thus being ready to enter also the flesh of the jaw of the fish 63. After being liberated from the rubber nubs 7, the treble hook 3 is pulled rearward under the struggling force of the fish and all the three points 11, 13 and 15 of the treble hook 3 are in a position to be inserted or are inserted inside the flesh of the jaw of the fish 63 as shown in FIG. 11.

The deformation of the weedguard 9 under the closing force of the fish 63 and the fact of having the rear common end 17 of the weedguard 9 resiliently attached to the body 1 decreases the chances of the weedguard 9 of being deformed or broken only after few uses. Its life is prolonged due to its springy connection to the body 1 of the spinner as above explained.

Figure 12:
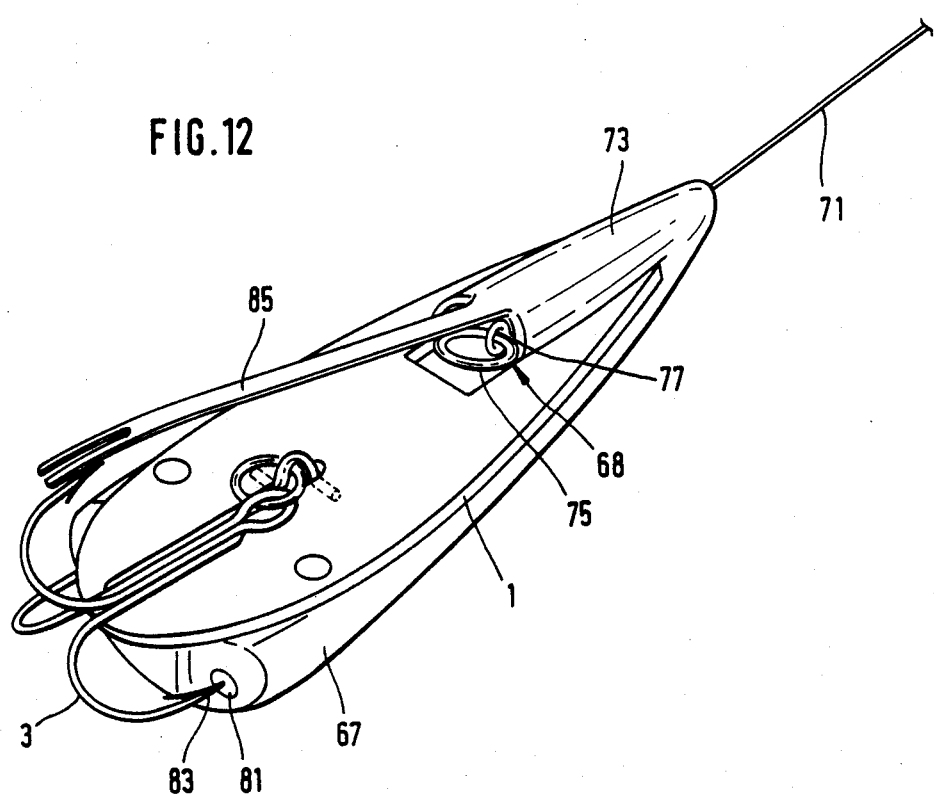
FIG. 12 is a perspective view of a spinner with a cover body having a conical head according to a further embodiment.

In FIG. 12, the body 1 of the spinner as shown in FIG. 1, is covered on its upper surface 55 (shown in FIGS. 2, 3 and 8) with cover means such a cover body 67 which may have any desired shape and color. The cover body 67 can be made of therrmoplastic and may be snap-fit on the spinner body 1 (as shown in FIG. 17), or may be integrally molded with it.

One of the advantages of having such a cover body 67 is to provide at the end of the spinner, attached by means of a connection system 68 to a fishing line 71, a conical head or shelter 73 which shelters the connection system 68.

Figure 15:
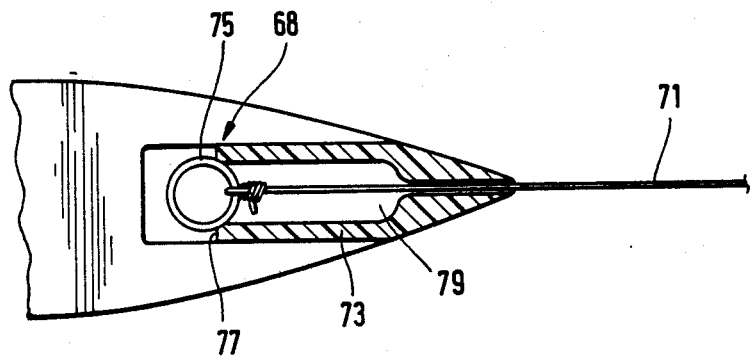
FIG. 15 is a cross-section made along the conical head of FIG. 14, showing a different connection system of a fishing line to the pulling end of the body of the spinner.

The connection system 68 can comprises a swivel 69 and aring 75, the ring abutting against edges 77 of the conical head 73 (see FIG. 13) or it can comprise only a ring 75 which simply abuts against the edges 77, the ring 75 being directly connected to the fishing line 71 (see FIG. 15). In the latter case, it has been suprisingly found that even without a swivel the spinner is provided with a very good swivel action in the water under the pulling force of the fishing line. The fact of having the ring 75 simply abut against the edges 77 of the conical head has provided a good swiveling action.

Figure 13:
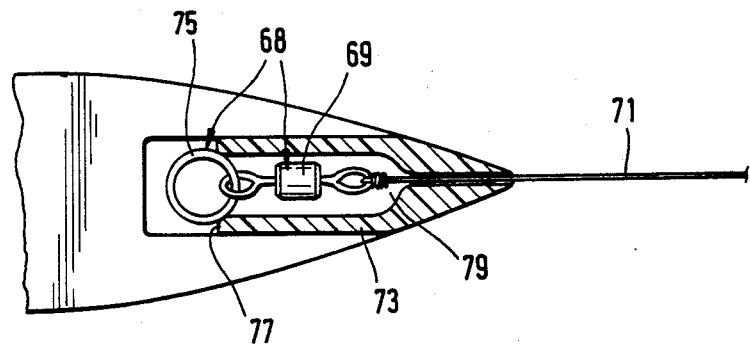
FIG. 13 is a cross-section made along the conical head of the cover body of FIG. 12 showing a connection system with a swivel which connects a fishing line to the body of the spinner.

The conical head 73 is hollow and is provided with the edges 77 against which the ring 75, forming part of the connection system 68, comes to rest in order to prevent the displacement of the connection system 68, either with the swivel 69 and the ring 75 as in FIG. 13, or only with the ring as in FIG. 15, and their attachments, inside the hollow conical head 73 and towards the narrow conical interior end portion 79 thereof, thus preventing the damaging of the conical head due to the traction action of the fishing line on the connection system 68.

The connection system 68 thus freely cooperating with the hollow conical head 73 (FIGS. 13 and 15) provides a very good swiveling action for the traction line 71 and at the same time the conical head 73 prevents the collecting of algae, vegetation or weed by the connection system 68 during the displacement of the spinner in the water. In fact, due to the tapering shape of the conical head 73 toward the fishing line 71, it is difficult for the algae, vegetation or weed to be collected by this part of the spinner and particularly by the connection system, sheltered by the conical head 73.

The cover body 67, which is made of thermoplastic but which can also be made of any other suitable material, provides also retaining means 81 performing the function of the nubs 7 as shown in FIGS. 1 and 2, for holding and retaining the points 83 of the treble hook 3. The retaining means 81 may be the plastic material of the cover body 67 or it may be any other suitable material which releasably holds the points 83 of the treble hook 3.

The cover body 67 with its special form also provides a better protection against the collecting of weed, vegetation or algae by the elements of the upper surface 55 of the body 1 of the spinner, such as the counter heads 63 of the nubs 7, as shown in FIG. 1 and FIG. 3, and of the elements 53, 57 and 59, as shown in FIG. 8, though these elements are so shaped as to themselves provide a protection against the collecting of the algae or weed. However, when they are covered by the cover body 67 as shown in FIGS. 12, 4 and 16, a better protection is provided.

As above-mentioned, the cover body 67 may be molded together with the spinner body 1 or it may be molded separately and afterwards snap-fit over the body of the spinner as shown in FIG. 17.

A weedguard 85 with a fork shaped end forms part of the conical head 73 and projects rearwardly therefrom as best shown in FIG. 12.

Figure 14:
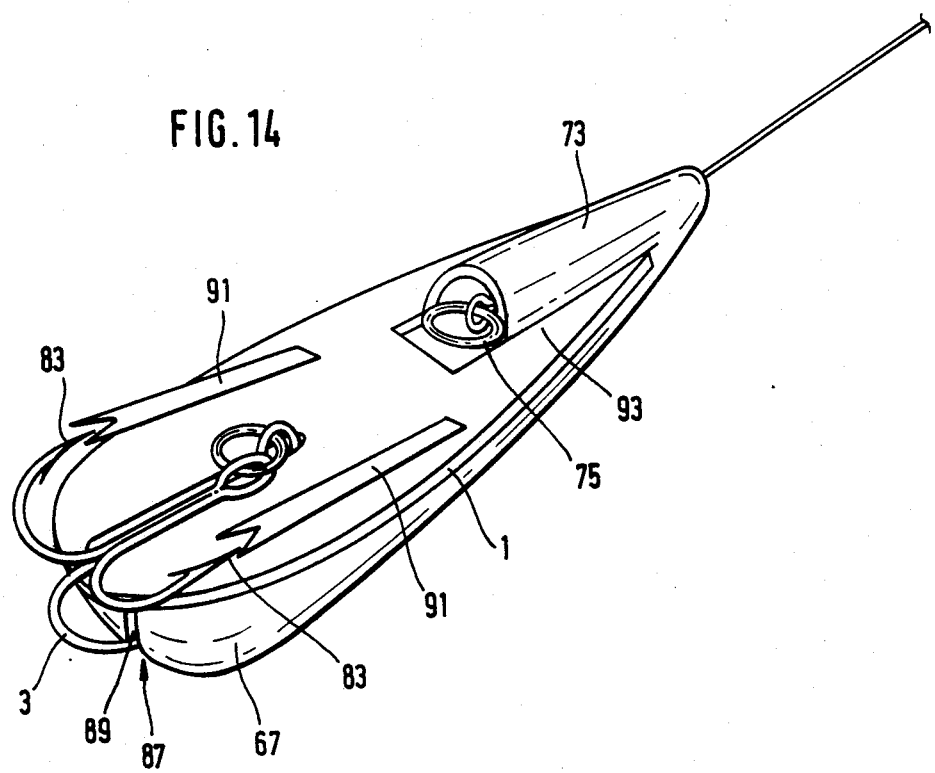
FIG. 14 is a perspective view of yet a further embodiment of a spinner with a cover body having a conical head.

In the embodiment shown in FIG. 14, only one of the points 87 of the treble hook 3 is releasably held by a slot 89 or even simply by the plastic material of the cover body 67, the remaining two points 83 being free. Two weedguards 91 projects from the bottom surface 93 and prevents algae and weed from being collected by the two free ends 83 of the treble hook 3, during the displacement of the spinner inside the water.

As in the embodiments shown in FIGS. 1 to 11, the treble hook 3 is adapted to be pulled rearward under the struggling force of a fish and slides along a rail or a slot as in FIGS. 3 and 7 or along similar sliding elements A second improvement which has been made is for any kind of spinner already on the market or also for spinners of the present application as above explained.

Figure 18:
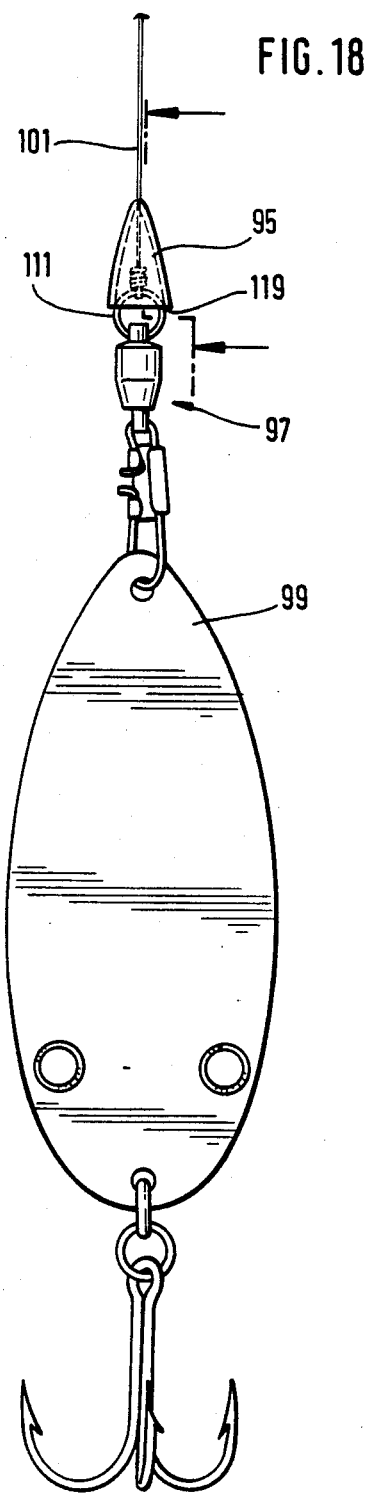
FIG. 18 is a top view of yet another spinner provided with a swivel system and a protective conical head.

The second improvement consists in the provision of a conical head or protection 95 to be mounted cooperatively with a connection system and particularly a swivel system 97 attached to the pulling end 99 of a spinner as shown in FIGS. 18. 19 and 20.

FIG. 18 shows a known spinner already on the market having the improved conical head 95 which provides a better protection against the collecting of algae or weed by the loose end 103 of a fishing line 101 (see FIG. 20) and also provides means for a better swiveling action of the swivel system 97.

In order to attain the first aim, namely to prevent the collecting of algae or weed by the loose end 103 of a fishing line 101, the conical head 95 is provided with retaining means in the form of a cut-off part 107, having a slit 109 in which the tip 105 of the loose end 103 of the fishing line 101 is inserted after being connected to a ring 111 of the swivel system 97. The loose end 103 should be cut substantially flush with the upper surface 113 of the cut-off part 107 in order not to form any means for collecting any kind of weed or algae. The tip 105 loose end 103 is thus securely maintained in the slit 109 without hampering the good functioning of the swivel system 97.

Figure 20:
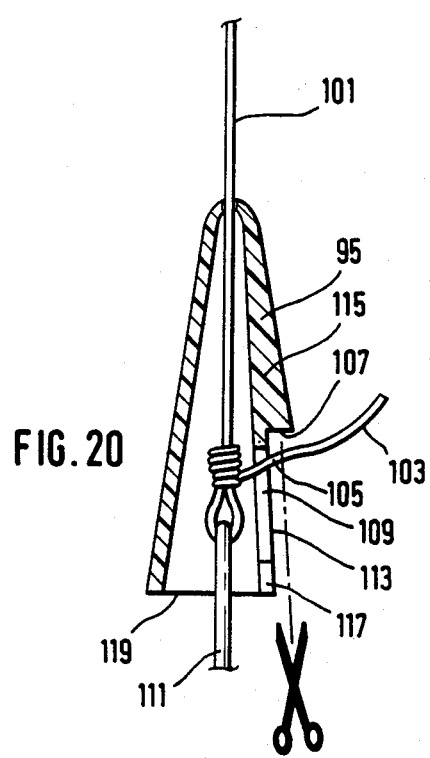
FIG. 20 is a cross-section view of the protective conical head, shown in FIG. 19, cooperating with a fishing line.
Figure 19:
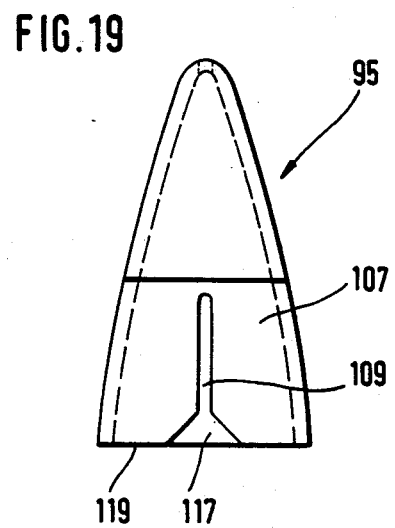
FIG. 19 is a top view of the protective conical head shown in FIG. 18.

The cut-off part 107 is made on the wall 115 of the head, and the slit 109 is made in the cut-off part as shown in FIGS. 19 and 20. The slit 109 has a funnel-shaped entry 117 in order to facilitate the entry of the loose end 103 of the fishing line 101 therein.

The swivel system 97 is prevented, by means of the ring 111 or any other kind of means, to be forced inside the hollow body of the conical head 95 under the traction force of the fishing line 101, thus preventing damage to conical head 95. The ring 111 abuts against the entrance 119 of the conical protective head 95, which is hollow, and prevents the swivel system 97 from being forced inside the head 95.

A different type of connection system may also be envisaged, such as a system without the swivel.

Although the invention was described hereinabove with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A fishing lure, comprising:
   a fishing lure body having a front and rear portion;
   a fishing treble hook having barbed points and means for attachment of said lure to said hook, said attachment allowing for an extended and retracted position of said hook;
   a replaceable spring-steel weed guard positioned to protect said hook from snagging weeds while said hook is in the retracted position;
   replaceable rubber nubs releasably attached to and located under said body to permit embedding of said barbed points into said nubs when said hook is in said retracted position; and
   said barbed points being forced free of said nubs and said hook being free to move to said extended position upon a fish striking said hook.

2. A fishing spinner according to claim 1, wherein said hook is swingingly attached to a hole provided at said rear part of the body by means of a chain having such a predetermined length as to provide a swinging connection of said hook to said body at a predetermined distance from the rear part of said body when said hook is liberated from said holding means and is in an extended position out of the boundaries of the body.

3. A fishing spinner according to claim 4, wherein said chain has a first end provided with a first ring attached to said hole at said rear part of the body and a second end provided with a second ring attached to the eye of said treble hook by means of a third ring.

4. A fishing spinner according to claim 1, wherein:
   said hook is slidably mounted underneath of said body.

5. A fishing spinner according to claim 4, further comprising:
   means for detachably holding at least one point of said hook for maintaining said hook in a retracted position underneath and within the bounderies of said body and preventing it from swinging during its displacement in water, and means for providing the sliding of said hook from said retracted position to an extended libarated position beyond the rear part of said body.

6. A fishing spinner according to claim 1, wherein:
said hook is slidably mounted underneath of said body, and further comprising:
means for preventing weed, vegetation or algae from being collected by said hook during its displacement in water in said retracted position.

7. A fishing spinner according to claim 1, wherein:
said hook is slidably mounted underneath of said body, and
said holding means detachably holding at least one point of said hook for maintaining said hook in a retracted position underneath and within the bounderies of said body and preventing it from swinging during its displacement in water, and further comprising:
means for providing the sliding of said hook from said retracted position to an extended liberated position beyond the rear part of said body, and
means for preventing weed, vegetation or algae from being collected by said hook during the displacement of the spinner in water with said hook in said retracted position.

8. A fishing spinner according to claim 7, wherein:
said hook is a treble hook,
said means for detachably holding at least one point of said hook are rubber nubs,
said means for providing the sliding of said hook comprises a track element along which the end of the treble hook opposite at least said one point slides.
said means for preventing weed, vegetation or algae from being collected by said hook is a deformable means.

9. A fishing spinner according to claim 4, wherein two points of said treble hook are detachably held by two rubber nubs located opposite each other at lateral sides of the rear part at the bottom surface of said body, and wherein said end of said hook is formed as an eye and is connected to a ring which hangingly slides along said track element for positioning said treble hook in said retracted position or in an extended position when said two points are liberated from said two rubber nubs under the bite and struggling and pulling force of a caught fish.

10. A fishing spinner, according to claim 5, wherein:
said hook is a treble hook,
said means for detachably holding at least one point of said hook are rubber nubs, and
said means for providing the sliding of said treble hook comprises a longitudinal slot in said body, slot through which passes one end part of a weight element, end part which is swivelled to the end of the treble hook opposite said at least one point.

11. A fishing spinner, according to claim 7, wherein:
said hook is a treble hook,
said means for detachably holding at least one point of said hook are rubber nubs,
said means for providing the sliding of said treble hook comprises a longitudinal slot in said body, slot through which passes one end part of a weight element, end part which is swivelled to the end of the treble hook opposite said at least one point,
said means for preventing weed, vegetation or algae from being collected by said hook is a deformable means.

12. A fishing spinner according to claim 11, wherein two points of said treble hook are detachably held by two rubber nubs located opposite each other at lateral sides of the rear part at the bottom surface of the body, and wherein said end of said hook is formed as an eye and is connected to a ring, the other end part of said weight element having a dimension greater than the width of the slot in such a way that said weight element never traverses said slot and keeps said treble hook slidably hanging underneath the body of the spinner, said treble hook being thus adapted to slide along said slot to be positionned in said retracted position or in said extended position when said two points are liberated from said two nubs under the bite and struggling and pulling force of a caught fish.

13. A fishing spinner according to claim 1, wherein said spring-steel wires comprises two branches with a common end in the form of a substantially three quarter of a circle adapted to be pivotally and replaceably snap-fit around a shank of a third nub, between a head of said third nub and the bottom surface of the body, said third nub being connected to the bottom surface at the front part of the body.

14. A fishing spinner according to claim 13, wherein said third nub is replaceably force-fit into an opening made in said body, said shank being adapted to lodge inside said opening, a counter-head replaceably maintaining the entire third nub in place.

15. A fishing spinner according to claim 14, wherein said common end of said spring-steel wires is in the form of "10 past 10" on a watch dial.

16. A fishing spinner according to claim 15, wherein said third rubber nub provides a springy connection of said spring-steel wires to said body in such a way that it is said third rubber nub which absorbs all the efforts to which is subjected said spring-steel wires when said wires undergoe heavy deformation under the, struggling action of the jaw of a caught fish.

17. A fishing spinner according to claim 8, wherein said deformable means comprise spring-steel wires having two branches with a common end in the form of a substantially three quarter of a circle adapted to be pivotally and replaceably snap-fit around a shank of a third nub, between a head of said third nub and the bottom surface of the body, said third nub being connected to the bottom surface at the front part of the body.

18. A fishing spinner according to claim 17, wherein said third nub is replaceably force-fit into an opening made in said body, said shank being adapted to lodge inside said opening, a counter-head replaceably maintaining the entire third nub in place.

19. A fishing spinner according to claim 18, wherein said common end of said spring-steel wires is in the form of "10 past 10" on a watch dial.

20. A fishing spinner according to claim 19, wherein said third rubber nub provides a springy connection of said spring-steel wires to said body in such a way that it is said third rubber nub which absorbs all the efforts to which is subjected said spring-steel wires when said wires undergoe heavy deformation under the struggling action of the jaw of a caught fish.

21. A fishing spinner according to claim 11, wherein said deformable means comprise spring-steel wires having two branches with a common end in the form of a substantially three quarter of a circle, adapted to be pivotally and replaceably snap-fit around a shank of a third nub, between a head of said third nub and said bottom surface of the body, said third nub being connected to the bottom surface at the front part of the body.

22. A fishing spinner according to claim 21, wherein said third nub is replaceably force-fit into an opening made in said body, said shank being adapted to lodge inside said opening, a counter-head replaceably maintaining the entire third nub in place.

23. A fishing spinner according to claim 22, wherein said common end of said spring-steel wires is in the form of "10 past 10" on a watch dial.

24. A fishing spinner according to claim 23, wherein said third rubber nub provides a springy connection of said spring-steel wires to said body in such a way that it is said third rubber nub which absorbs all the efforts to which is subjected said spring-steel wires when said wires undergoe heavy deformation under the struggling action of the jaw of a caught fish.

25. A fishing spinner according to claim 10, wherein said body has an upper surface provided with a stop element against which said weight element bears when it is in a forward position with the treble hook in a retracted position underneath and within the bounderies of said body.

26. A fishing spinner according to claim 25, wherein said stop element has an inclined sliding surface adapted to prevent the collecting of weed, vegetation or algae by the upper surface of the body and said weight element.

27. A fishing spinner according to claim 1, wherein:
said hook is a treble hook,
said means for holding said hook in a retracted position are rubber nubs provided at said underneath of the body, and
said means for preventing weed, vegetation or algae from being collected by said hook are spring-steel wires.

28. A fishing spinner according to claim 27, comprising a further stop element on the bottom surface of the body in order to prevent the unwanted pivotal of said spring-steel wires under the struggling action of the jaw of a caught fish.

29. A fishing spinner according to claim 8 or 11, wherein said deformable means are spring-steel wires comprising two branches with a common end in the form of a substantially three quarter of a circle adapted to be pivotally and replaceably snap-fit around a shank of a third nub, between a head of said third nub and the bottom surface of the body, said third nub being connected to the bottom surface at the front part of the body, said spinner comprising a further stop element on the bottom surface of the body in order to prevent the unwanted pivotal of said spring-steel wires under the struggling action of the jaw of a caught fish.

30. A fishing spinner according to claim 1, wherein said means for preventing weed, vegetation or algae from being collected by said treble hook are deformable means.

31. A fishing spinner according to claim 1, wherein said means for preventing weed, vegetation or algae from being collected by said treble hook are replaceable means.

32. A fishing spinner according to claim 1, comprising:
cover means adapted to shelter a connection system which connects the body to a fishing line, said connection system being provided at the pulling end of the body, said cover means thus preventing algae and weed from being collected by said connection system.

33. A fishing spinner according to claim 32, wherein said connection system comprises a swivel, and said cover means swivelingly shelters said connection system.

34. A fishing spinner according to claim 32, wherein said connection system comprises a ring swivelingly abutting against edges of said covers means, said ring being connected directly to said fishing line.

35. A fishing spinner according to claim 32, wherein said cover means comprises a conical head inside which the swivel system is lodged.

36. A fishing spinner according to claim 35, wherein the conical head is hollow and is provided with abutment means against which a ring of the swivel system abuts in order to prevent the displacement of the entire swivel system inside and towards the hollow conical interior end of the conical head in order to prevent any damage to the conical head.

37. A fishing spinner according to claim 36, wherein the conical head is terminated with an end tapering towards a fishing line attached to the body of the spinner.

38. A fishing spinner according to claim 32, wherein the cover means is snap-fit to the body of the spinner.

39. A fishing spinner according to claim 32, wherein the cover means is of thermoplastic material and is molded together with the spinner.

40. A fishing spinner according to claim 32, wherein the cover means is of thermoplastic material and is molded separately from the spinner.

41. A fishing spinner according to claim 32, wherein a weedguard for preventing algae and weed from being collected by the treble hook at the bottom side of the spinner body is connected to a conical head of the cover means.

42. A fishing spinner according to claim 32, wherein the hook is a treble hook and wherein only one of the points of the treble hook is releasably held by said cover means, the remaining two points being free, two weedguards covering said two free points thus preventing algae or weed from being collected by said free points.

43. A fishing spinner according to claim 32, wherein the hook is a treble hook and wherein only one of the points of the treble hook is releasably held by a slot of said cover means, the remaining two points being free, two weedguards projecting from the bottom surface of the body and covering said two free points thus preventing algae or weed from being collected by said free points.

* * * * *